(12) United States Patent
Park et al.

(10) Patent No.: US 11,202,460 B2
(45) Date of Patent: Dec. 21, 2021

(54) SACCHARIDE MIXTURE CONTAINING PSICOSE WITH IMPROVED SWEETNESS QUALITY AND CRYSTALLIZATION

(71) Applicant: SAMYANG CORPORATION, Seoul (KR)

(72) Inventors: Ji Won Park, Seongnam-si (KR); Go-Eun Kim, Gwangju (KR); Sung Won Park, Daejeon (KR); Hye Jung Kim, Daejeon (KR); Chong Jin Park, Daejeon (KR); Kang Pyo Lee, Seoul (KR)

(73) Assignee: SAMYANG CORPORATION, Seoul (KR)

( * ) Notice: Subject to any disclaimer, the term of this patent is extended or adjusted under 35 U.S.C. 154(b) by 620 days.

(21) Appl. No.: 15/567,462

(22) PCT Filed: Apr. 28, 2016

(86) PCT No.: PCT/KR2016/004473
§ 371 (c)(1),
(2) Date: Oct. 18, 2017

(87) PCT Pub. No.: WO2016/186338
PCT Pub. Date: Nov. 24, 2016

(65) Prior Publication Data
US 2018/0255814 A1    Sep. 13, 2018

(30) Foreign Application Priority Data
May 15, 2015 (KR) .................. 10-2015-0068296

(51) Int. Cl.
*A23L 27/30* (2016.01)
*A23L 29/30* (2016.01)

(52) U.S. Cl.
CPC ............... *A23L 27/33* (2016.08); *A23L 27/30* (2016.08); *A23L 29/30* (2016.08);
(Continued)

(58) Field of Classification Search
CPC .......... A23L 27/30; A23L 27/33; A23L 29/30; A23V 2250/606; A23V 2200/132; A23V 2002/00; A23V 2250/61
See application file for complete search history.

(56) References Cited

U.S. PATENT DOCUMENTS 4,455,333 A † 6/1984 Hong
2009/0068710 A1   3/2009 Izumori et al.
(Continued)

FOREIGN PATENT DOCUMENTS

CN    102869783    1/2013
CN    103333935    10/2013
(Continued)

OTHER PUBLICATIONS

J. Park et al., "Construction of Heat-inducible Expression Vector of Corynebacterium glutamicum and C. ammoniagenes: Fusion of λ Operator with Promoters isolated from C. ammoniagenes". Journal of Microbiology and Biotechnology, vol. 18, No. 4, p. 639-647, Apr. 1, 2008.
(Continued)

*Primary Examiner* — Subbalakshmi Prakash
(74) *Attorney, Agent, or Firm* — Lex IP Meister, PLLC

(57) ABSTRACT

The present invention relates to a mixed saccharide composition containing psicose, glucose and fructose with improved sweetness quality and crystallization, and a method for preventing crystallization of a mixed saccharide composition containing a psicose.

10 Claims, 5 Drawing Sheets
Specification includes a Sequence Listing.

(52) U.S. Cl.
CPC ..... *A23V 2002/00* (2013.01); *A23V 2200/132* (2013.01); *A23V 2250/606* (2013.01); *A23V 2250/61* (2013.01)

(56) References Cited

U.S. PATENT DOCUMENTS

| | | | |
|---|---|---|---|
| 2012/0094940 A1 | 4/2012 | Takamine et al. |
| 2013/0274350 A1 † | 10/2013 | Okuma |
| 2014/0271746 A1 | 9/2014 | Woodyer et al. |
| 2014/0271747 A1 | 9/2014 | Woodyer et al. |

FOREIGN PATENT DOCUMENTS

| | | |
|---|---|---|
| EP | 0613953 | 9/1994 |
| JP | 49-124241 | 11/1974 |
| JP | 2001-011690 | 1/2001 |
| JP | 2009-131221 | 6/2009 |
| JP | 2011-205913 | 10/2011 |
| JP | 2011-206054 | 10/2011 |
| JP | 2013-053121 | 3/2013 |
| JP | 2013-138660 | 7/2013 |
| JP | 2014-113059 | 6/2014 |
| JP | 2014-140347 | 8/2014 |
| KR | 10-1159934 | 6/2012 |
| KR | 10-1318422 | 10/2013 |
| KR | 10-2014-0021974 | 2/2014 |
| KR | 10-2014-0080282 | 6/2014 |
| KR | 10-2014-0116847 | 10/2014 |
| KR | 10-2015-0015030 | 2/2015 |
| KR | 10-1617379 | 5/2016 |
| WO | 2008-142860 | 8/2010 |
| WO | 2014-066711 | 5/2014 |
| WO | 2014/066711 A1 † | 5/2014 |
| WO | 2014-092490 | 6/2014 |
| WO | 2014-168018 | 10/2014 |

OTHER PUBLICATIONS

Landis W.Doner, "Isomerization of d-fructose by base: Liquid-chromatographic evaluation and the isolation of d-psicose", Carbohydrate Research, 1979, vol. 70, No. 2, pp. 209-216.
Fred W. Schenck et al., "Starch Hydrolysis Products", VCH Publishers, Inc., 1992, pp. 177-185,196-197.
Anonymous: "Psicose—Wikipedia", Wikipedia, Mar. 13, 2015, pp. 1-3, XP055519563.
EPO, the extended European search report of EP 16796665.4 dated Nov. 15, 2018.

† cited by third party

[FIG. 1]
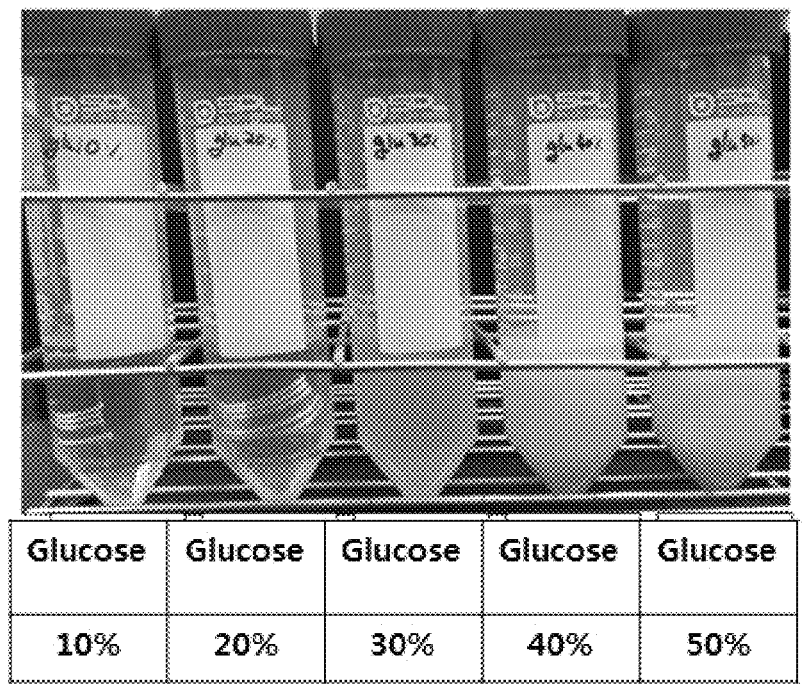

[FIG. 2]
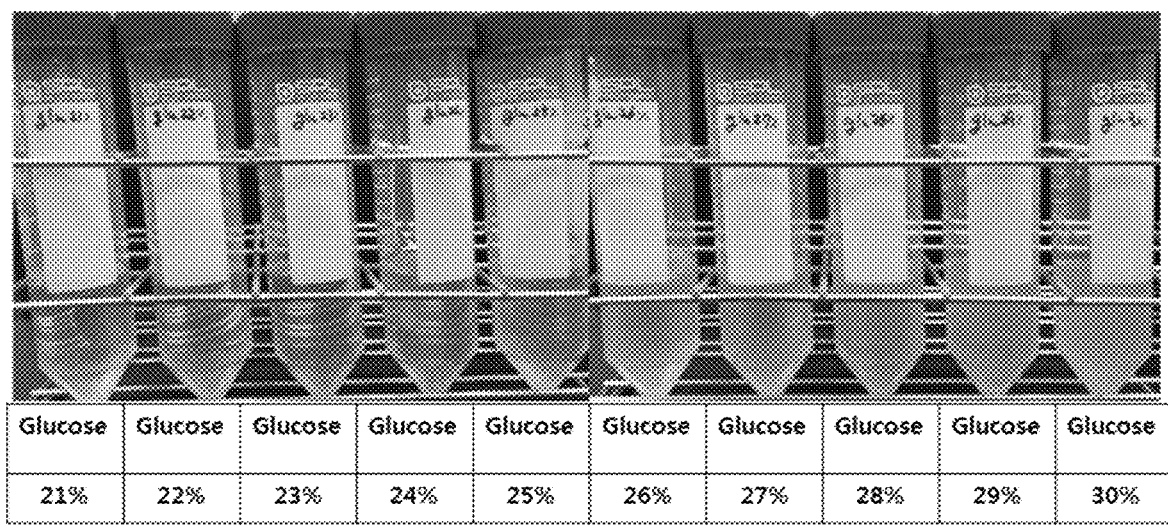

[FIG. 3]
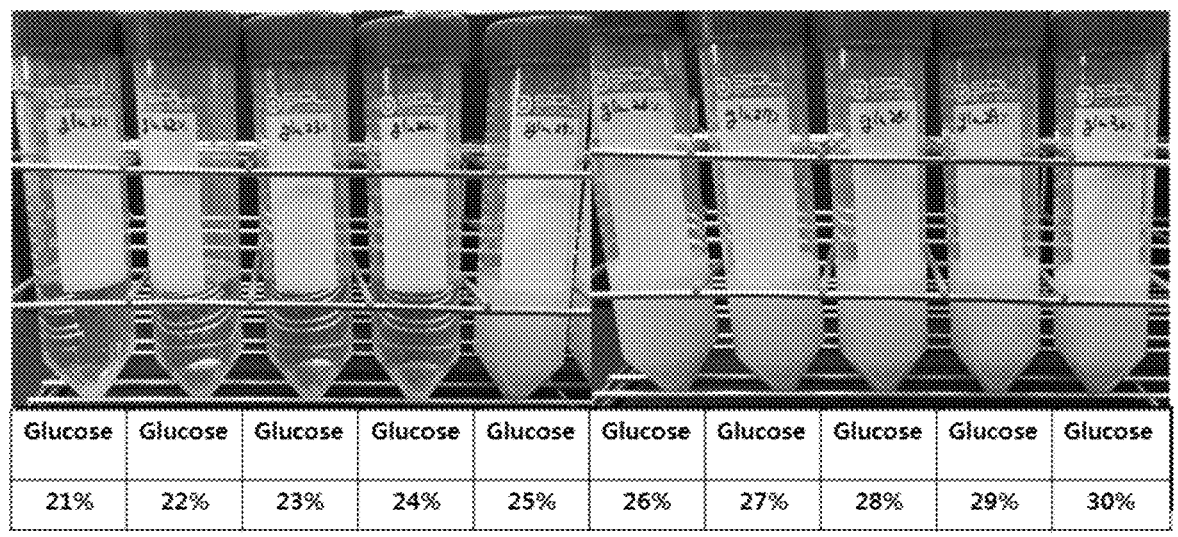

[FIG. 4]
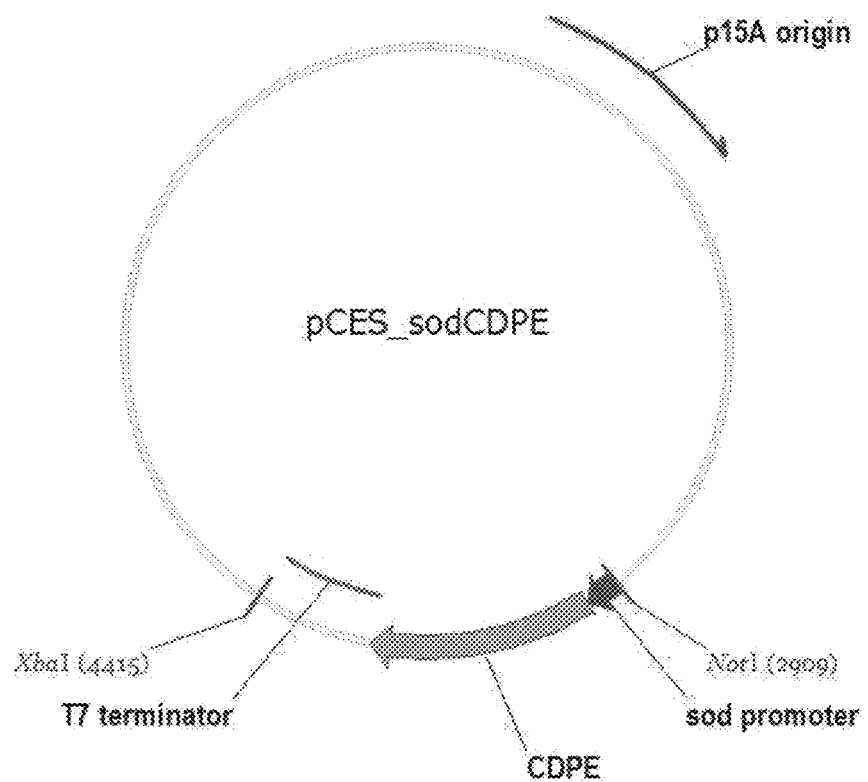

[FIG. 5]
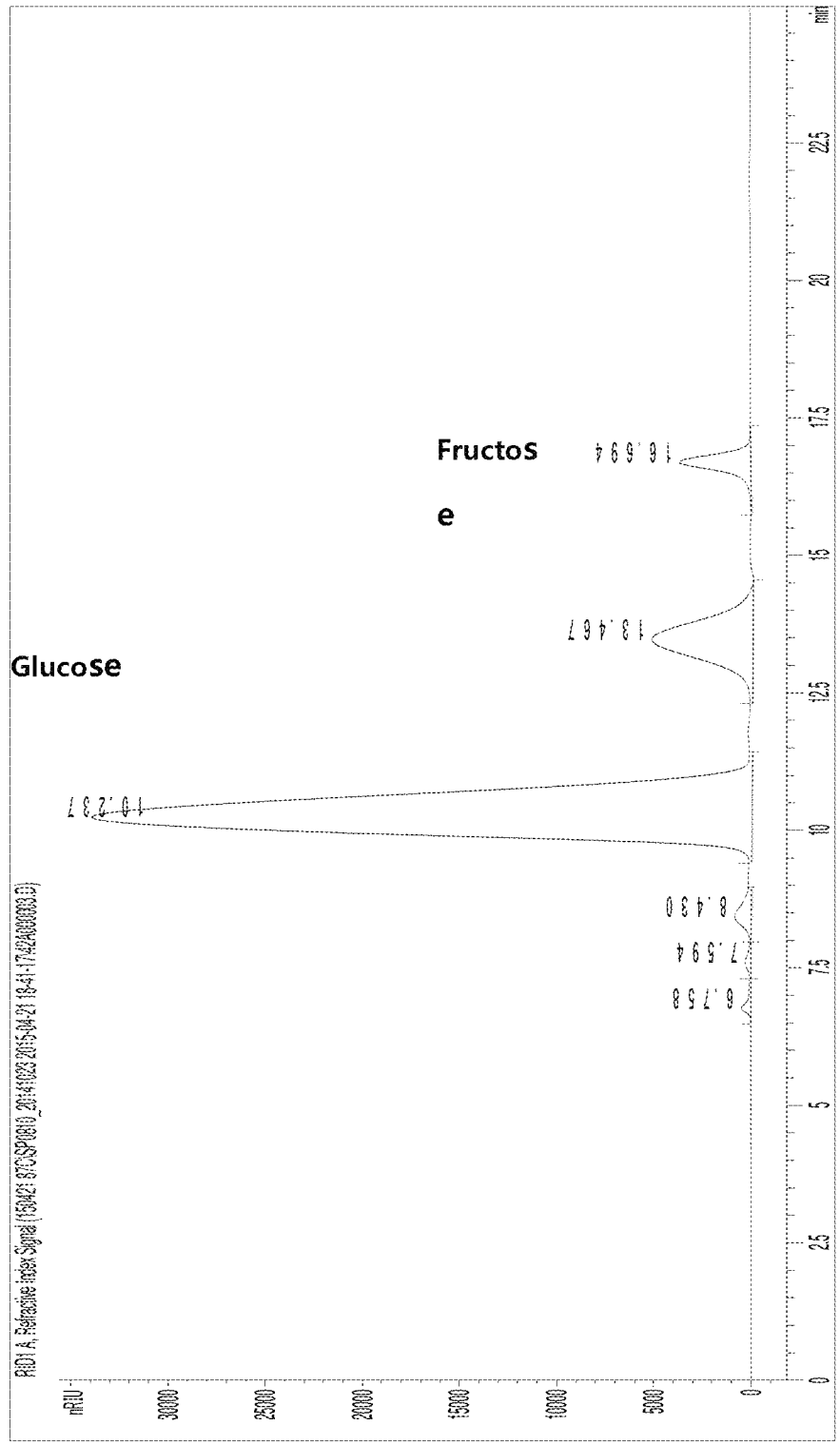

SEQUENCE LISTING

```
<160> NUMBER OF SEQ ID NOS: 9

<210> SEQ ID NO 1
<211> LENGTH: 356
<212> TYPE: DNA
<213> ORGANISM: Artificial Sequence
<220> FEATURE:
<223> OTHER INFORMATION: synthetic (sod promoter (6))

<400> SEQUENCE: 1
aagcgcctca tcagcggtaa ccatcacggg ttcgggtgcg aaaaaccatg ccataacagg    60
aatgttcctt tcgaaaattg aggaagcctt atgcccttca accctactta gctgccaatt   120
attccgggct tgtgacccgc tacccgataa ataggtcggc tgaaaaattt cgttgcaata   180
tcaacaaaaa ggcctatcat tgggaggtgt cgcaccaagt acttttgcga agcgccatct   240
gacggatttt caaaagatgt atatgctcgg tgcggaaacc tacgaaagga ttttttaccc   300
atggctgtat acgaactccc agaactcgac tacgcatacg acgaaaggat tacaaa       356

<210> SEQ ID NO 2
<211> LENGTH: 93
<212> TYPE: DNA
<213> ORGANISM: Artificial Sequence
<220> FEATURE:
<223> OTHER INFORMATION: synthetic (Tac1 promoter (4))

<400> SEQUENCE: 2
tgacaattaa tcatcggctc gtatattgtg tggaattgtg agcggataac aatttcacac    60
```

```
aggaaacaga attcccgggg aaaggattac aaa                              93
```

<210> SEQ ID NO 3
<211> LENGTH: 112
<212> TYPE: DNA
<213> ORGANISM: Artificial Sequence
<220> FEATURE:
<223> OTHER INFORMATION: synthetic (Tac2 promoter (4))

<400> SEQUENCE: 3

```
tgacaattaa tcatccggct cgtataatgt taacaatttg tggaattgtg agcggacaca   60
caggaaacag accatggaat tcgagctcgg tacccgggga aaggattaca aa          112
```

<210> SEQ ID NO 4
<211> LENGTH: 30
<212> TYPE: DNA
<213> ORGANISM: Artificial Sequence
<220> FEATURE:
<223> OTHER INFORMATION: synthetic (Trc promoter (1))

<400> SEQUENCE: 4

```
tgacaattaa tcatcggcct cgtataatgt                                   30
```

<210> SEQ ID NO 5
<211> LENGTH: 7
<212> TYPE: DNA
<213> ORGANISM: Artificial Sequence
<220> FEATURE:
<223> OTHER INFORMATION: synthetic (Ribosome binding region)

<400> SEQUENCE: 5

```
gaaagga                                                             7
```

<210> SEQ ID NO 6
<211> LENGTH: 7
<212> TYPE: DNA
<213> ORGANISM: Artificial Sequence
<220> FEATURE:
<223> OTHER INFORMATION: synthetic (Spacer sequence)

<400> SEQUENCE: 6

```
ttacaaa                                                             7
```

<210> SEQ ID NO 7
<211> LENGTH: 289
<212> TYPE: PRT
<213> ORGANISM: Artificial Sequence
<220> FEATURE:
<223> OTHER INFORMATION: synthetic (amino acid sequence of an enzyme
      protein originated from Clostridium scindens)

<400> SEQUENCE: 7

Met Lys His Gly Ile Tyr Tyr Ala Tyr Trp Glu Gln Glu Trp Ala Ala
1               5                   10                  15

Asp Tyr Lys Arg Tyr Val Glu Lys Ala Ala Lys Leu Gly Phe Asp Ile
            20                  25                  30

Leu Glu Val Gly Ala Ala Pro Leu Pro Asp Tyr Ser Ala Gln Glu Val
        35                  40                  45

Lys Glu Leu Lys Lys Cys Ala Asp Asp Asn Gly Ile Gln Leu Thr Ala
    50                  55                  60

Gly Tyr Gly Pro Ala Phe Asn His Asn Met Gly Ser Ser Asp Pro Lys
65                  70                  75                  80

Ile Arg Glu Glu Ala Leu Gln Trp Tyr Lys Arg Leu Phe Glu Val Met

```
                85                  90                  95
Ala Gly Leu Asp Ile His Leu Ile Gly Gly Ala Leu Tyr Ser Tyr Trp
            100                 105                 110

Pro Val Asp Phe Ala Thr Ala Asn Lys Glu Glu Asp Trp Lys His Ser
            115                 120                 125

Val Glu Gly Met Gln Ile Leu Ala Pro Ile Ala Ser Gln Tyr Gly Ile
            130                 135                 140

Asn Leu Gly Met Glu Val Leu Asn Arg Phe Glu Ser His Ile Leu Asn
145                 150                 155                 160

Thr Ser Glu Glu Gly Val Lys Phe Val Thr Glu Val Gly Met Asp Asn
                165                 170                 175

Val Lys Val Met Leu Asp Thr Phe His Met Asn Ile Glu Glu Ser Ser
            180                 185                 190

Ile Gly Asp Ala Ile Arg His Ala Gly Lys Leu Leu Gly His Phe His
            195                 200                 205

Thr Gly Glu Cys Asn Arg Met Val Pro Gly Lys Gly Arg Thr Pro Trp
        210                 215                 220

Arg Glu Ile Gly Asp Ala Leu Arg Glu Ile Glu Tyr Asp Gly Thr Val
225                 230                 235                 240

Val Met Glu Pro Phe Val Arg Met Gly Gly Gln Val Gly Ser Asp Ile
                245                 250                 255

Lys Val Trp Arg Asp Ile Ser Lys Gly Ala Gly Glu Asp Arg Leu Asp
            260                 265                 270

Glu Asp Ala Arg Arg Ala Val Glu Phe Gln Arg Tyr Met Leu Glu Trp
            275                 280                 285

Lys

<210> SEQ ID NO 8
<211> LENGTH: 870
<212> TYPE: DNA
<213> ORGANISM: Artificial Sequence
<220> FEATURE:
<223> OTHER INFORMATION: synthetic (modified nucleic acid sequence (1)
      of the enzyme protein of SEQ ID NO: 7)

<400> SEQUENCE: 8
atgaaacacg gtatctacta cgcgtactgg gaacaggaat gggcggcgga ctacaaacgt    60
tacgttgaaa aagcggcgaa actgggtttc gacatcctgg aagttggtgc ggcgccgctg   120
ccggactact ctgcgcagga agttaaagaa ctgaaaaaat gcgcggacga caacggtatc   180
cagctgaccg cgggttacgg tccggcgttc aaccacaaca tgggttcttc tgaccccgaaa  240 atccgtgaag aagcgctgca gtggtacaaa cgtctgttcg aagttatggc gggtctggac   300
atccacctga tcggtggtgc gctgtactct tactggccgg ttgacttcgc gaccgcgaac   360
aaagaagaag actggaaaca ctctgttgaa ggtatgcaga tcctggcgcc gatcgcgtct   420
cagtacggta tcaacctggg tatggaagtt ctgaaccgtt cgaatctca catcctgaac    480 acctctgaag aaggtgttaa attcgttacc gaagttggta tggacaacgt taaagttatg   540
ctggacacct tccacatgaa catcgaagaa tcttctatcg gtgacgcgat ccgtcacgcg   600
ggtaaactgc tgggtcactt ccacaccggt gaatgcaacc gtatggttcc gggtaaaggt   660
cgtaccccgt ggcgtgaaat cggtgacgcg ctgcgtgaaa tcgaatacga cggtaccgtt   720
gttatggaac cgttcgttcg tatgggtggt caggttggtt ctgacatcaa agtttggcgt   780
gacatctcta aaggtgcggg tgaagaccgt ctggacgaag acgcgcgtcg tgcggttgaa   840
```

```
ttccagcgtt acatgctgga atggaaataa                                    870
```

<210> SEQ ID NO 9
<211> LENGTH: 870
<212> TYPE: DNA
<213> ORGANISM: Artificial Sequence
<220> FEATURE:
<223> OTHER INFORMATION: synthetic (modified nucleic acid sequence(2) of
      the enzyme protein of SEQ ID NO:7)

<400> SEQUENCE: 9

```
atgaagcacg gcatctacta cgcatactgg gagcaggagt gggcagcaga ctacaagcgc    60
tacgttgaga aggcagcaaa gctgggcttc gacatcctgg aggttggcgc agcaccactg   120
ccagactact ccgcacagga ggttaaggag ctgaagaagt gcgcagacga caacggcatc   180
cagctgaccg caggctacgg cccagcattc aaccacaaca tgggctcctc cgacccaaag   240
atccgcgagg aggcactgca gtggtacaag cgcctgttcg aggttatggc aggcctggac   300
atccacctga tcggcggcgc actgtactcc tactggccag ttgacttcgc aaccgcaaac   360
aaggaggagg actggaagca ctccgttgag ggcatgcaga tcctggcacc aatcgcatcc   420
cagtacggca tcaacctggg catggaggtt ctgaaccgct tcgagtccca catcctgaac   480
acctccgagg agggcgttaa gttcgttacc gaggttggca tggacaacgt taaggttatg   540
ctggacacct tccacatgaa catcgaggag tcctccatcg gcgacgcaat ccgccacgca   600
ggcaagctgc tgggccactt ccacaccggc gagtgcaacc gcatggttcc aggcaagggc   660
cgcaccccat ggcgcgagat cggcgacgca ctgcgcgaga tcgagtacga cggcaccgtt   720
gttatggagc cattcgttcg catgggcggc caggttggct ccgacatcaa ggtttggcgc   780
gacatctcca agggcgcagg cgaggaccgc ctggacgagg acgcacgccg cgcagttgag   840
ttccagcgct acatgctgga gtggaagtaa                                    870
```

SACCHARIDE MIXTURE CONTAINING PSICOSE WITH IMPROVED SWEETNESS QUALITY AND CRYSTALLIZATION

TECHNICAL FIELD

The present invention relates to a mixed saccharide composition containing psicose with improved sweetness quality and crystallization, and a method for preventing crystallization of a mixed saccharide composition containing a psicose.

BACKGROUND ART

Sugar is mainly composed of sucrose and is one of the representative sweeteners that add sweetness to food. Sugar has excellent sweetness, and it has been regarded as the most preferable sweetener which improves taste of food and stimulates an appetite by being added to various foods, processed foods, etc. from the past.

However, recently, problems have been raised as the harmfulness of sugar continues to be revealed. Specifically, excessive intake of sugar is pointed out as a major cause of various kinds of lifestyle diseases such as obesity, diabetes as well as cavities etc., and therefore, there is a need to develop a sweetener that can replace it.

Accordingly, there is a continuous need to develop a more improved substitute sweetener, which has sweetness enough to replace sugar and is low in calorie, and moreover, is not a sweetener that prevents excessive intake of sugar by merely inhibiting absorption of saccharides.

Psicose is an epimer of fructose (D-fructose) and is one kind of functional saccharides known as a rare saccharide, and it has been known to have an effect on prevention and improvement of diabetes, since it has sweetness of 70% of sugar and almost zero calorie. In addition, psicose is known to have excellent solubility, and it is one of materials where utilization for food is attracting attention.

However, if psicose is used alone and utilized as a sweetener for food addition, as not only psicose has relatively lower sweetness degree than sugar but also its sweetness quality is different from that of sugar, there will be problems that adversely affect consumer preference since it is difficult to satisfy taste of consumers who are accustomed to sweetness of the conventional sugar.

Therefore, there have been attempts to improve sweetness degree and/or sweetness quality by adding various kinds of monosaccharides, disaccharides, or high-sweetness degree sweeteners, etc. However, in case of saccharide mixture, there are problems such as turbidity, crystallization, or degradation of sweetness quality, etc. depending on sugar composition, and it is necessary to solve that, and particularly, the more the amount of other saccharides is increased, the worse the physical properties may be. Thus, there is a need to provide a mixed saccharide composition with improved sweetness quality and physical properties, etc. of a saccharide mixture containing psicose.

DISCLOSURE

Technical Problem

An object of the present invention is to provide a mixed saccharide composition containing psicose with improved sweetness degree and sweetness quality.

Another object of the present invention is to provide a mixed saccharide composition containing psicose, which prevents or delays crystal precipitation or turbidity development of the mixed saccharide composition containing psicose, and a stabilized mixed saccharide composition containing psicose, wherein crystal precipitation or turbidity is not developed even under severe conditions such as low temperature as well as room temperature, presence of materials inducing crystals, or long-term storage, etc.

Further object of the present invention is to provide food, drugs or quasi-drugs containing the mixed saccharide composition containing psicose.

Still further object of the present invention is to provide a method for preventing production of a saccharide crystal of the mixed saccharide composition, by adjusting the glucose content in the saccharide composition containing psicose, fructose and glucose at a specific compositional range.

Technical Solution

The present invention relates to a mixed saccharide composition with improved sweetness quality and physical properties of a saccharide mixture containing psicose and a method for preventing production of a saccharide crystal of a mixed saccharide composition containing psicose.

Specifically, the present invention relates to a non-crystallization mixed saccharide composition, wherein the glucose content is 24 parts by weight or lower, based on 100 parts by weight of solid content of the total saccharides contained in the mixed saccharide composition containing psicose, glucose and fructose. It is possible to improve sweetness quality of psicose in the mixed saccharide composition, and prevent turbidity and crystallization of mixed saccharide solution at the same time.

The mixed saccharide composition according to the present invention may include the glucose at an amount of 24 parts by weight or lower, 23.5 parts by weight or lower, 23.28 parts by weight or lower, 20 parts by weight or lower, 18 parts by weight or lower, 15 parts by weight or lower, 10 parts by weight or lower, or 5 parts by weight or lower, based on 100 parts by weight of solid content of the total saccharides contained in the mixed saccharide composition.

In addition, based on 100 parts by weight of the solid content of the total saccharides contained in the mixed saccharide composition, the glucose content may be 24 parts by weight or lower, 23.5 parts by weight or lower, 23.28 parts by weight or lower, 20 parts by weight or lower, 18 parts by weight or lower, 15 parts by weight or lower, 10 parts by weight or lower, or 5 parts by weight or lower, and the lower limit may be 0.1 parts by weight or more, or 1 parts by weight or more, and for example, it may be 0.1 to 24 parts by weight, 0.1 to 23.28 parts by weight, 0.1 to 20 parts by weight, 0.1 to 18 parts by weight, 0.1 to 15 parts by weight, 0.1 to 10 parts by weight, 0.1 to 5 parts by weight, 1 to 24 parts by weight, 1 to 23.28 parts by weight, 1 to 23.5 parts by weight, 1 to 20 parts by weight, 1 to 18 parts by weight, 1 to 15 parts by weight, 1 to 10 parts by weight, 1 to 5 parts by weight. Crystallization or turbidity of the mixed saccharide composition containing glucose, psicose and fructose can be prevented by adjusting the glucose content of the mixed saccharide composition.

The mixed saccharide composition may contain only glucose, psicose and fructose, or may further contain one or more saccharide selected from the group consisting of monosaccharides other than glucose, psicose and fructose, disaccharides and oligosaccharides.

In addition, based on 100 parts by weight of the total solid content of glucose, psicose and fructose contained in the mixed saccharide composition, the fructose content may be lower than 30 parts by weight, lower than 25 parts by weight, lower than 20 parts by weight, lower than 15 parts by weight, lower than 10 parts by weight, or lower than 5 parts by weight. The sweetness quality of the mixed saccharide composition containing psicose can also be improved by adjusting the fructose content.

The mixed saccharide composition according to the present invention may have the fructose content of 25 parts by weight or lower and the total content of fructose and psicose of over 70 parts by weight, based on 100 parts by weight of the total solid content of glucose, psicose and fructose contained in the mixed saccharide composition. In addition, a mixed saccharide composition wherein the glucose content is 24 parts by weight or lower and the fructose content is 15 parts by weight or lower, and the psicose content is 60 parts by weight or more, based on 100 parts by weight of the total solid content of glucose, psicose and fructose contained in the mixed saccharide composition can be provided.

In the mixed saccharide composition according to the present invention, it is preferable that the psicose, glucose or fructose is D-psicose, D-glucose or D-fructose, respectively.

The mixed saccharide composition according to the present invention is low in calorie as containing psicose, and improves sweetness quality as containing glucose and fructose, and the mixed saccharide composition in which crystal formation and turbidity are prevented is provided. The mixed saccharide composition according to the present invention is non-crystallization saccharide mixture, and for example, it may be one in which a saccharide crystal is not precipitated under the condition of storage at −20° C. to 38° C. for 1 year.

In addition, the mixed saccharide composition according to the present invention may be saccharide mixture syrup which is prepared by reacting a composition for producing psicose containing at least one selected from the group consisting of a psicose epimerase, a microbial cell of strain producing the epimerase, a culture of the strain, a lysate of the strain, and an extract of the lysate or culture, with a fructose-containing raw material or one prepared by using thereof. In addition, the mixed saccharide composition may be prepared by mixing psicose, glucose and fructose respectively with the mixed saccharide composition and it may be prepared by mixing apsicose crystallization mother liquor and a glucose crystallization mother liquor.

In case of preparing the mixed saccharide composition using a crystallization mother liquor, for example, it may be prepared by mixing a psicose crystallization mother liquor having a psicose content of 80% by weight or higher and a glucose crystallization mother liquor having a glucose content of 80% by weight or higher.

The psicose crystallization mother liquor has a main component of psicose, and the psicose of the total saccharide solid content may be 50% by weight or higher, for example, 60% by weight or more, 70% by weight or higher, or 80% by weight or higher, and specifically, it may contain psicose of 60 to 99.9% by weight, 70 to 99.9% by weight, or 80 to 99.9% by weight, based on the total saccharide solid content.

In addition, the psicose crystallization mother liquor may further contain one or more kinds selected from the group consisting of various monosaccharides, disaccharides, oligosaccharides and rare saccharides. The monosaccharides include glucose and fructose, etc., and the rare saccharides may be allose, tagatose, altrose, etc.

The glucose crystallization mother liquor has a main component of glucose, and the glucose of the total saccharide solid content may be 50% by weight or more, for example, 60% by weight or more, 70% by weight or more, or 80% by weight or more, and specifically, it may contain glucose of 60 to 99.9% by weight, 70 to 99.9% by weight, or 80 to 99.9% by weight, based on the total saccharide solid content.

In addition, the glucose crystallization mother liquor may further contain one or more kinds selected from the group consisting of various monosaccharides, disaccharides and oligosaccharides.

In the present description, a crystallization mother liquor of saccharides means a mother liquor remained after forming crystals or powders by crystallizing or powdering a targeted saccharide in an original solution for preparation containing the targeted saccharide and separating the crystals or powders, and it is called a psicose crystallization mother liquor when the targeted saccharide is psicose, and it is called a glucose crystallization mother liquor when the targeted saccharide is glucose. Commonly the glucose crystallization mother liquor is also called hydrol.

As an example of the psicose crystallization mother liquor, D-psicose can be prepared by a method for continuously producing D-psicose from fructose, comprising converting fructose into D-psicose using a carrier in which Ensifer strain having a D-psicose epimerase is immobilized.

D-psicose solution prepared by the method is separated into high purity by using $Ca^+$ type separation resin and concentrated up to 80% by weight to proceed crystallization. The dewatered liquid which has been dewatered without being crystallized in the dewatering process through the crystallization process can be obtained as a psicose crystallization mother liquor.

An example of the glucose crystallization mother liquor is a crystallization mother liquor remained after collecting glucose crystals, and commonly, the saccharides contained in the mother liquor contains 80 to 99% by weight of glucose and 1 to 20% by weight of disaccharides and/or oligosaccharides (for example, trisaccharides, tetrasaccharides, etc.) based on the total saccharide solid.

The psicose of the present invention may be prepared by conducting a chemical synthesis method or a biological method using a psicose epimerase, and preferably it may be prepared by conducting the biological method.

Thus, the psicose may be prepared by reacting a composition for producing psicose containing one or more kinds selected from the group consisting of a psicose epimerase, a microbial cell of strain producing the epimerase, a culture of the strain, a lysate of the strain, and an extract of the lysate or culture, with a fructose-containing raw material.

In one embodiment of the present invention, as a method for preparing psicose according to a biological method, it may be prepared by culturing a strain producing a psicose epimerase or a recombinant strain in which a gene encoding a psicose epimerase is introduced, and reacting a psicose epimerase obtained thereby with a fructose-containing raw material. The psicose epimerase may be provided as a liquid state or a solid state using an immobilized enzyme.

In addition, it may be prepared by obtaining a strain producing a psicose epimerase or a recombinant strain in which a gene encoding a psicose epimerase is introduced, and reacting a composition for producing psicose containing one or more kinds selected from the group consisting of a psicose epimerase, a microbial cell of strain producing the epimerase, a culture of the strain, a lysate of the strain, and an extract of the lysate or culture with a fructose-containing raw material. It may be conducted as a liquid state reaction or a solid state reaction using an immobilized microbial cell when psicose is prepared by using a microbial cell of the strain producing a psicose epimerase.

In a specific embodiment of the present invention, a strain producing a psicose epimerase may be a strain which has a high stability and can produce a psicose epimerase with high yield, and the recombinant strain may use various host cells, for example, *E. coli, Bacillus* sp. strain, *Salmonella* sp. strain and *Corynebacterium* sp. strain, etc., but preferably it may be *Corynebacterium* sp. strain, which is a GRAS strain, and may be *Corynebacterium glutaricum*.

In case of using a recombinant strain, a psicose epimerase can use an encoding gene of enzymes derived from various strains, and for example, it may be an enzyme derived from *Treponema primitia* disclosed in Korean Patent Publication No. 2014-0021974, an enzyme derived from *Ruminococcus torques* disclosed in Korean Patent Publication No. 2014-0080282 and an enzyme derived from *Clostridium scindens* disclosed in Korean Patent No. 10-1318422, and may also be an enzyme derived from *Ensifer adhaerens*.

In one specific embodiment, a psicose epimerase according to the present invention may be an enzyme derived from *Clostridium scindens*, and for example, may comprise an amino acid sequence of SEQ ID NO: 7, and may be encoded by a base sequence comprising a nucleic acid sequence of SEQ ID NO: 8 or SEQ ID NO: 9. The nucleic acid sequence of SEQ ID NO: 8 is *E. coli* optimized nucleic acid sequence, and SEQ ID NO: 9 is a nucleic acid sequence modified appropriately for *Corynebacterium*.

In the preparation of a recombinant strain according to one embodiment of the present invention, expression of an enzyme can be regulated using a regulatory sequence positioned on the top of the nucleic acid sequence encoding psicose epimerase, and the regulatory sequence essentially comprises a transcriptional promoter, and it may further comprise a ribosome-binding region and/or a spacer sequence. The elements constituting the regulatory sequence may be directly linked or linked by including one or more linkers of a nucleic acid sequence having 1 to 100 bases, for example, 5 to 80 bases.

In one specific embodiment, the transcriptional promoter may be a nucleic acid molecule expressing a nucleic acid sequence encoding a psicose epimerase in a *Corynebacterium* sp. strain, but may be tac1, tac2, trc, sod promoter. The sod promoter is derived from *Corynebacterium glutaricum*, and preferably comprises the nucleic acid sequence of SEQ ID NO: 1 as a core region. The trc promoter is an *E. coli*-derived promoter and is prepared by the combination of trp promoter and lac UV5 promoter. The tac1 promoter is an *E. coli*-derived promoter and is prepared by the combination of trp promoter and lac UV5 promoter. The tac2 promoter is an *E. coli*-derived promoter and is prepared by the combination of trp promoter and lac UV5 promoter, and is an optimized form by modifying the sequence of Tac 1 promoter.

The ribosome binding region and spacer may be chemically linked directly or indirectly linked by interposing a linker nucleic acid sequence in between. In one embodiment of the present invention, the ribosome binding region and spacer sequence may comprise one oligonucleotide sequentially linked in the 5' to 3' order. The nucleic acid sequences of promoter sequence, ribosome binding region and spacer sequence according to the one embodiment of the present invention is shown in the following Table 1. The bold underlined portions in Table 1 indicate ribosome binding region, spacer sequence, linker sequence, etc. in the regulatory sequence.

TABLE 1

| SEQ ID NO | sequence (5'→3') | name |
|---|---|---|
| 1 | aagcgcctcatcagcggtaaccatcacgggttcgggtgcgaaaaaccatgccataacag gaatgttcctttcgaaaattgaggaagccttatgcccttcaaccctacttagctgccaattatt ccgggcttgtgacccgctacccgataaataggtcggctgaaaaatttcgttgcaatatcaa caaaaaggcctatcattgggaggtgtcgcaccaagtactttttgcgaagcgccatctgacg gattttcaaaagatgtatatgctcggtgcggaaacctac gaaaggattttttacccatggctgtatacgaactcccagaactcgactacgcatacg ac gaaaggattacaaa | Sod promoter |
| 2 | tgacaattaatcatcggctcgtatattgtgtggaattgtgagcggataacaatttcacac aggaaacagaattcccggggaaaggattacaaa | tac1 promoter |
| 3 | tgacaattaatcatccggctcgtataatgttaacaatttgtggaattgtgagcggacaca caggaaacagaccatggaattcgagctcggtacccggggaaaggattacaaa | Tac2 promoter |
| 4 | tgacaattaatcatcggcctcgtataatgt | trc promoter |
| 5 | gaaagga | Ribosome binding region |
| 6 | ttacaaa | Spacer sequence |

It is preferable that the psicose epimerase according to the present invention is excellent in enzyme activity and thermal stability, and in the specific embodiment of the present invention, the combination of a transcriptional promoter or a regulatory sequence with a gene encoding a psicose epimerase, and all of tac1, tac2, trc, trip, sod promoters can provide more than adequate protein expression with the psicose epimerase used in the present invention, and when sod promoter is used, it is more preferable, as the result that protein folding is robust and thermal stability is high can be obtained.

A method for producing psicose using a recombinant strain, etc. may be conducted by methods disclosed in Korean Patent Publication No. 2014-0021974, Korean Patent Publication No. 2014-0080282 and Korean Patent No. 10-1318422, but not particularly limited thereto.

In the method for producing psicose, for effective production of psicose, the concentration of fructose used as a substrate may be 40 to 100% (w/v), 40 to 75% (w/v), for example, 50 to 75% (w/v) based on the total reactants. Since when the concentration of fructose is lower than the above range, the economy is lowered, and when it is higher than the above range, the fructose is not dissolved well, the concentration of fructose is preferable within the above range. The fructose may be used in the form of a solution dissolved in a buffer solution or water (for example, distilled water).

The mixed saccharide composition according to the present invention can be used as various foods, drugs or quasi-drugs, etc., since crystallization is prevented and sweetness quality is improved.

Effect of the Invention

The mixed saccharide composition containing psicose and the method for preventing crystallization thereof according to the present invention improve sweetness quality and physical properties, etc. of the saccharide mixture containing psicose, and specifically provide a stabilized mixed saccharide composition containing psicose, wherein crystal precipitation or turbidity is prevented, even under severe conditions such as low temperature as well as room temperature, presence of materials inducing crystals, or long-term storage, etc., thereby being applied to various products such as food, drugs, quasi-drugs or cosmetics, etc.

BRIEF DESCRIPTION OF DRAWINGS

FIG. 1 is a photograph showing the result of crystallization acceleration test by glucose concentration of high purity psicose syrup composition according to Example 2 of the present invention.

FIG. 2 is a photograph showing the result of crystallization acceleration test by glucose concentration of high purity psicose syrup composition according to Example 3 of the present invention.

FIG. 3 is a photograph showing the result of crystallization acceleration test by glucose concentration of high purity psicose syrup composition when stored for a long period of time according to Example 4 of the present invention.

FIG. 4 is a diagram showing one example of a recombinant expression vector (pCES_sodCDPE) for producing a psicose syrup according to the present invention.

FIG. 5 is a graph showing the result of separating and drying crystals from liquid fructose syrup according to Example 1 of the present invention and analysis by HPLC.

DETAILED DESCRIPTION OF THE EMBODIMENTS

The present invention will be described in more detail by the following examples. However, the following examples are only preferable examples, and the present invention does not limited thereto.

Preparative Example 1: Preparation of a Psicose Crystallization Mother Liquor 1-1: Preparation of a Strain Producing Psicose An encoding gene of a psicose epimerase derived from *Clostridiuim scindens* (*Clostridiuim scindens* ATCC 35704) (DPE gene; Gene bank: EDS06411.1) was synthesized as a modified form of polynucleotide by optimizing for *E. coli* and called CDPE. The polynucleotide optimized for *E. coli* (SEQ ID NO: 2) and sod promoter and T7 terminator obtained from pET21a vector were obtained as each template through PCR, and these were linked as one template by overlap PCR method and cloned into pGEM T-easy vector through T-vector cloning, thereby confirming sod promoter (SEQ ID NO: 1), optimized CDPE sequence of SEQ ID NO: 8 and a sequence of a polynucleotide comprising T7-terminator.

The entire confirmed polynucleotide was inserted into the same restriction enzyme site of an expression vector pCES208 (J. Microbiol. Biotechnol., 18:639-647, 2008) using restriction enzymes NotI and XbaI(NEB), and a recombinant vector pCES208/psicose epimerase (pCES_sodCDPE) was prepared. The cleavage map of the prepared recombinant vector (pCES_sodCDPE) was shown in FIG. 4.

*Corynebacterium glutaricum* was transformed with the prepared recombinant vector (pCES_sodCDPE) plasmid using electroporation. Colonies were picked and inoculated in 4 ml of LB medium (tryptone 10 g/L, NaCl 10 g/L, yeast extract 5 g/L) supplemented with Kanamycin at a final concentration of 15 ug/ml, and then cultured for approximately 16 hrs at the culture conditions of 30° C. and 250 rpm. Then, 1 ml of the culture was collected and inoculated in 100 ml LB medium comprising 15 ug·ml of Kanamycin, and the culture was continued for over 16 hrs. After lysis of cells cultured using beadbeater, only supernatant is obtained and mixed with a sample buffer as 1:1, and then heated at 100° C. for 5 minutes. The prepared samples were subjected to electrophoresis on a 12% SDS-PAGE gel (composition: running gel—3.3 ml H2O, 4.0 ml 30% acrylamide, 2.5 ml 1.5M Tris buffer (pH 8.8), 100 μl 10% SDS, 100 μl, 10% APS, 4 μl TEMED/stacking gel—1.4 ml H2O, 0.33 ml 30% acrylamide, 0.25 ml 1.0M Tris buffer (pH 6.8), 20 μl 10% SDS, 20 μl 10% APS, 2 μl TEMED) at 180V for approximately 50 minutes, and the protein expression was confirmed. After the expression of CDPE was confirmed on the SDS-PAGE gel, His-tag purification was proceeded using Ni-NTA resin for accurate measurement of expression level, and the expression rate was calculated using a calculation formula (expression rate (%)=(Purified protein (mg)/Total soluble protein (mg))×100). The prepared transformed *Corynebacterium glutaricum* produced 16.62 mg of the total water-soluble proteins and 1.74 mg of purified enzyme proteins.

1-2: Preparation of Psicose Syrup

In order to prepare psicose from fructose using the recombinant strain producing psicose epimerase obtained from Preparative Example 1-1, cells were collected by centrifugation in the strain culture.

Then, the cell suspension was treated with 0.05% (v/v) of en emulsifier (M-1695) in a final volume and treated at 35° C. (±5° C.) for 60 minutes. The microbial cells in which the reaction was completed were collected after the supernatant comprising the emulsifier was removed again using a centrifuge.

For the preparation of immobilized beads, the collected microbial cells were mixed with D.W. to a final microbial cell concentration of 5% (v/v), and 4% (v/v) of alginic acid dissolved in water and 5% (v/v) of the collected microbial cells were mixed at 1:1, and it was refrigerated at 4° C. to remove bubbles generated during mixing. The refrigerated mixture solution was injected through Neddel (inner diameter 0.20 to 0.30 mm) and formed into a droplet shape, and dropped by weight, and the dropped mixture solution was dropped into a previously prepared 100 mM calcium chloride (CaCl2) solution and cured, and spherical or elliptical beads (diameter 2.0 to 2.2 mm) were formed. The formed beads were soaked in a 100 mM calcium chloride solution and mixed evenly by a stirrer so as to be further cured.

After all the mixture solution was injected, the beads were further cured while being refrigerated for 4 to 6 hrs, and then cured for approximately 6 hrs in a refrigerated state by replacing a new 100 mM calcium chloride solution. After beads completely cured were skimmed and moisture was completely removed, water was added 3 times as much as the volume of the beads and then it was stirred for 10 minutes, and the calcium chloride solution was removed by treating the beads with this process 3 times. The reaction substrate was adjusted to pH 6.8 to 7.2 with 3N NaOH, and liquid fructose or crystalline fructose can be the substrate depending on the kind of product. The beads replaced with the reaction substrate comprising 10 mM manganese were transferred to a reactor, and then reacted at the reaction temperature of 50° C. for approximately 30 to 60 minutes, and soaking of beads was completed with manganese and fructose. The beads completely soaked have a reduced diameter of approximately 1.6 to 1.8 mm and its strength was also increased. After removing the substrate of beads completely soaked, they were filled in an immobilized reaction column and then used for the production of a psicose syrup.

<Immobilized Column Reaction Conditions>

Reaction temperature: internal temperature of the column jacket 50° C.

Substrate flow rate: 0.5 SV (space velocity L. h−1)

Reaction substrate: crystalline fructose 40 brix, pH 6.8 to 7.2,

Bead preparation: 2.5% (w/w) microbial cells, 2% (w/w) alginic acid mixture and 10 mM Mn2+ soaking To the immobilized reaction column, a raw material whose raw material solution comprised 75% of solid and the fructose content was 92 parts by weight when the total solid content was 100 parts by weight was provided, thereby preparing a psicose syrup, which is a saccharide mixture of two compositions. That is, the 25(w/w) % psicose syrup having glucose:fructose:psicose:oligosaccharide=6:67:25:2 in the ratio by weight of glucose:fructose:psicose:oligosaccharide was collected from the reaction solution, and used for the following Examples.

1-3: Preparation of a Psicose Crystallization Mother Liquor

In order to remove impurities such as color and ion components, the psicose syrup obtained from Preparative Example 1-2 was passed through at a rate of 2 times volume of the ion exchange resin per hour in a column at the room temperature which was filled with resin in which anion exchange resin and cation and anion exchange resin were mixed and desalted, and then crystallization was proceeded by separating as a high-purity psicose solution using chromatograph which was filled with an ion exchange resin of the calcium (Ca2+) type and concentrating up to 80% by weight. The dewatered solution which was not crystallized in a dewatering process through a crystallizing process but dewatered was collected as a crystallization mother liquor, and the mother liquor was 65.1 Bx and comprised fructose 8.4% by weight and psicose 91.6% by weight as a solid composition.

Example 1: Crystallization Material of Fructose-Containing Syrup

Crystals in commercially available liquid fructose 42 (fructose 39.5% by weight and glucose 53.2% by weight) and liquid fructose 55 (fructose 54.0% by weight and glucose 37.0% by weight) syrup were collected and centrifuged at 5,000 RPM for 30 minutes, and then the supernatant was discarded and the crystalline portion was taken. To completely remove the syrup component, it was vacuum filtered using a 5 μm membrane filter while washing with ethanol. The aqueous solution passed through the filter was discarded, and then crystals remaining in the filter were dried in a 60° C. oven for one day.

As the result of HPLC analysis of dried crystals, the main component of crystals was shown as glucose 80% by weight in Table 2 and FIG. 5. The HPLC saccharide composition analysis was detected by RI by injecting 10 μl of a water solution sample at a flow rate of 0.6 ml/min using Aminex HPX-87C column (80° C.) of Biorad Company. Therefore, it was demonstrated that crystals produced in the fructose syrup were due to glucose in the syrup.

TABLE 2

| classification | tetrasaccharide or more | trisaccharide | disaccharide | glucose | fructose | ethanol |
|---|---|---|---|---|---|---|
| Sugar composition | 0.5% | 0.4% | 1.4% | 80.6% | 13.1% | 4.0% |

Example 2: Preparation of a Crystallization Syrup Composition

A high-purity psicose syrup was prepared by mixing a crystallization mother liquor produced after crystallizing the syrup comprising 95% by weight or more psicose content and a crystallization mother liquor after crystallizing glucose through high-purity separation in Preparative Example 1 at a certain mixing ratio.

Specifically, using the psicose crystallization mother liquor obtained in Preparative Example 1 (Samyang Genex, 65.1 Bx, solid composition: fructose 8.4% by weight, psicose 91.6% by weight) and the glucose crystallization mother liquor (hydrol) obtained in Preparative Example 2 (Samyang Genex, 65.3 Bx, solid composition: disaccharide or more 8.7% by weight, glucose 91.3% by weight), the syrup composition prepared by mixing various mixing ratios was prepared. The syrup composition was prepared to be the glucose content of 10% by weight, 20% by weight, 30% by weight, 40% by weight, or 50% by weight, respectively, and a concentrated syrup solution was prepared by concentrating to be 75Bx.

The glucose crystallization mother liquor product was obtained by after forming glucose crystals (anhydrous crystals or hydrocrystals) by crystallizing glucose original solution for preparation of glucose, filtering products and collecting glucose crystals. The obtained hydrol was 65.3 Bx and comprised disaccharide or more 8.7% by weight and glucose 91.3% by weight as the solid composition.

Anhydrous crystalline glucoses (Samyang Genex) were added to the concentrated syrup solution at a solid concentration of 0.5% by weight each, and the mixture was stored at 4° C. for 4 days, and the crystallization acceleration test was proceeded. The saccharide composition of the syrup solution obtained by mixing anhydrous glucose powder was shown in Table 3. Table 3 exhibited the solid composition of the psicose crystallization mother liquor and the glucose crystallization mother liquor composition of the present invention.

The presence of absence of crystal precipitation (turbidity) was observed and evaluated according to the following standard, and the result was shown in Table 4 and FIG. 1.

TABLE 3

| Mixture ratio (wt %) (Hydrol:Psicose mother liquor) | disaccharides or more | glucose | fructose | psicose |
|---|---|---|---|---|
| 55%:45% | 4.7% | 50.0% | 3.7% | 41.1% |
| 44%:56% | 3.8% | 40.0% | 4.7% | 51.6% |
| 33%:67% | 2.8% | 30.0% | 5.6% | 61.3% |
| 22%:78% | 1.9% | 20.0% | 6.5% | 71.2% |
| 11%:89% | 1.0% | 10.0% | 7.4% | 81.4% |

The following Table 4 exhibited the crystallization acceleration test result of the psicose crystallization mother liquor and the glucose crystallization mother liquor.

TABLE 4

| Storage time(hour) | Glucose 10% | Glucose 20% | Glucose 30% | Glucose 40% | Glucose 50% |
|---|---|---|---|---|---|
| 0 h | − | − | − | − | − |
| 1 h | − | − | − | + | + |
| 2 h | − | − | − | + | ++ |
| 3 h | − | − | − | + | ++ |
| 4 h | − | − | + | ++ | ++ |
| 5 h | − | − | + | ++ | ++ |
| 6 h | − | − | + | ++ | ++ |
| 12 h | − | − | + | ++ | ++ |
| 24 h | − | − | + | ++ | ++ |
| 48 h | − | − | + | +++ | +++ |
| 72 h | − | − | + | +++ | +++ |
| 96 h | − | − | + | +++ | +++ |

<Evaluation standard>
−: No crystal
±: Crystalline nuclei were produced but practical
+: Crystals were visible but had fluidity
++: Crystals were precipitated and there was turbidity
+++: Crystals were precipitated and had no fluidity As can be seen in Table 4 and FIG. 1, from the result of the glucose acceleration test, it was found that turbidity was formed when the glucose content in the syrup was 30% by weight or more, and particularly, it was confirmed that crystallization was proceeded in turbidity at the concentration of 40% by weight or more. In case that the glucose content was 20% by weight or lower, turbidity was not occurred, but in order to more specifically confirm the range of the glucose content, Example 3 was carried out by subdividing the glucose content in the range of 20 to 30% by weight.

Example 3: Preparation of Crystallization Syrup Composition

In order to elucidate the concentration of glucose inducing crystallization of syrup composition in detail, a crystallization test was conducted by preparing a syrup composition by further subdividing the glucose concentration.

Specifically, a crystallization acceleration test was conducted by preparing a concentrated syrup solution by mixing the psicose crystallization mother liquor and the glucose crystallization mother liquor in substantially the same manner as in Example 1. However, then, the composition of the high-purity psicose syrup was as same as Table 5. The result of observing the presence or absence of crystal precipitation (turbidity) was evaluated according to the same standard with Example 2 and shown in Table 6, Table 7 and FIG. 2. The following Table 5 exhibited the solid composition of the psicose crystallization mother liquor and the glucose crystallization mother liquor composition.

TABLE 5

| Mixture ratio (wt %) (Hydrol:Psicose mother liquor) | disaccharides or more | glucose | fructose | Psicose |
|---|---|---|---|---|
| 23%:77% | 2.1% | 21.0% | 6.5% | 70.5% |
| 24%:76% | 2.2% | 22.0% | 6.4% | 69.6% |
| 25%:75% | 2.3% | 23.0% | 6.3% | 68.7% |
| 27%:73% | 2.3% | 24.0% | 6.1% | 66.9% |
| 28%:72% | 2.4% | 25.0% | 6.0% | 66.0% |
| 29%:71% | 2.4% | 26.0% | 6.0% | 65.0% |
| 30%:70% | 2.5% | 27.0% | 5.9% | 64.1% |
| 31%:69% | 2.6% | 28.0% | 5.8% | 63.2% |
| 32%:68% | 2.7% | 29.0% | 5.7% | 62.3% |
| 33%:67% | 2.8% | 30.0% | 5.6% | 61.4% |

The following Tables 6 and 7 exhibited the crystallization acceleration test result of the psicose crystallization mother liquor and the glucose crystallization mother liquor composition.

TABLE 6

| Storage time(hr) | glucose 21% | glucose 22% | glucose 23% | glucose 24% | glucose 25% |
|---|---|---|---|---|---|
| 0 h | − | − | − | − | − |
| 1 h | − | − | − | − | − |
| 2 h | − | − | − | − | − |
| 3 h | − | − | − | − | − |
| 4 h | − | − | − | − | − |
| 5 h | − | − | − | − | − |
| 6 h | − | − | − | − | − |
| 12 h | − | − | − | − | − |
| 24 h | − | − | − | − | − |
| 48 h | − | − | − | − | + |
| 72 h | − | − | − | − | + |
| 96 h | − | − | − | − | + |

TABLE 7

| Storage time(hr) | glucose 26% | glucose 27% | glucose 28% | glucose 29% | glucose 30% |
|---|---|---|---|---|---|
| 0 h | − | − | − | − | − |
| 1 h | − | − | − | − | − |
| 2 h | − | − | − | − | + |
| 3 h | − | − | − | − | + |
| 4 h | − | − | − | − | + |
| 5 h | − | − | − | − | + |
| 6 h | − | − | − | − | + |

TABLE 7-continued

| Storage time(hr) | glucose 26% | glucose 27% | glucose 28% | glucose 29% | glucose 30% |
|---|---|---|---|---|---|
| 12 h | − | − | − | + | + |
| 24 h | + | + | + | + | + |
| 48 h | + | + | + | + | + |
| 72 h | + | + | + | + | + |
| 96 h | + | + | + | + | ++ |

As can be seen in Tables 6 and 7 and FIG. 2, from the result of the glucose acceleration test, it was found that turbidity was produced when the glucose content in the syrup was 25% by weight or more. In case that the glucose content was 24% by weight or lower, turbidity was not produced.

Based on the result of Example 3, since turbidity was not occurred even under a severe condition in case that the glucose content was 24% by weight or lower, the quality of products can be maintained when stored for a long time.

Example 4: Preparation of Crystallization Syrup Composition

In order to demonstrate that the quality of products was maintained when stored for a long time in case that the glucose content was 24% by weight or lower shown in the result of Example 3, a syrup composition was prepared in which the glucose concentration was subdivided as same as Example 3 and was subjected to long-term storage crystallization test.

Specifically, a crystallization acceleration test was conducted by preparing a concentrated syrup solution by mixing the psicose crystallization mother liquor and the glucose crystallization mother liquor in substantially the same manner as in Example 3. Then, the composition of the high-purity psicose syrup was as same as Table 5 of Example 3. In order to observe the presence or absence of crystal precipitation (turbidity), after stored in a low temperature chamber for 96 days, it was evaluated according to the same standard with Example 2, and the result was shown in Table 8, Table 9 and FIG. 3.

TABLE 8

| Storage time | glucose 21% | glucose 22% | glucose 23% | glucose 24% | glucose 25% |
|---|---|---|---|---|---|
| 96 days | − | − | − | − | +++ |

TABLE 9

| Storage time | glucose 26% | glucose 27% | glucose 28% | glucose 29% | glucose 30% |
|---|---|---|---|---|---|
| 96 days | +++ | +++ | +++ | +++ | +++ |

As can be seen in Table 8, Table 9 and FIG. 3 from the result of the glucose acceleration test, it was found that turbidity was occurred, when the glucose content in the syrup was 25% by weight or more. When the glucose content was 24% by weight or lower, turbidity was not occurred.

In summary, the results of Examples 2, 3 and 4, since turbidity was not occurred even under a severe condition, when the glucose content was 24% by weight or lower, the quality of products can be maintained when stored for a long time.

The invention claimed is:

1. A mixed saccharide composition with non-crystallization, comprising psicose, glucose and fructose, wherein the glucose content is 24 parts by weight or lower, the fructose content is about 1 to 10 parts by weight, and the psicose content is about 60 to 98 parts by weight, based on 100 parts by weight of a solid content of all saccharides contained in the mixed saccharide composition, wherein a saccharide crystal does not precipitate in the mixed saccharide composition, when 0.5 wt. % of a solid content of glucose based on the solid content of all saccharides contained in the mixed saccharide composition is further added to the mixed saccharide composition and the mixed saccharide composition is stored at 4° C. for 4 days, and wherein the mixed saccharide composition is a mixed saccharide solution.

2. The mixed saccharide composition of claim 1, wherein the total content of fructose and psicose is higher than 70 parts by weight, based on 100 parts by weight of the total solid content of all saccharides contained in the mixed saccharide composition.

3. The mixed saccharide composition of claim 1, wherein the psicose is D-psicose, glucose is D-glucose, and fructose is D-fructose.

4. A method for preventing production of a saccharide crystal in a mixed saccharide composition comprising psicose, glucose and fructose, by adjusting a glucose content to be 24 parts by weight or lower, based on 100 parts by weight of the solid content of all saccharides contained in the mixed saccharide composition, wherein the fructose content is about 1 to 10 parts by weight, and the psicose content is about 60 to 98 parts by weight, based on 100 parts by weight of the solid content of all saccharides contained in the mixed saccharide composition, wherein a saccharide crystal does not precipitate in the mixed saccharide composition, when 0.5 wt. % of a solid content of glucose based on the solid content of all saccharides contained in the mixed saccharide composition is further added to the mixed saccharide composition and the mixed saccharide composition is stored at 4° C. for 4 days, and wherein the mixed saccharide composition is a mixed saccharide solution.

5. The method of claim 4, wherein the total content of fructose and psicose is higher than 70 parts by weight, based on 100 parts by weight of the total solid content of all saccharides contained in the mixed saccharide composition.

6. The method of claim 4, wherein the adjusting a glucose content to be 24 parts by weight or lower glucose content is achieved by mixing a psicose crystallization mother liquor having a psicose content of 80% by weight or more and a glucose crystallization mother liquor having a glucose content of 80% by weight or more.

7. The method of claim 4, wherein the mixed saccharide composition is obtained by reacting a composition for producing psicose containing at least one selected from the group consisting of a psicose epimerase, a microbial cell of strain producing the epimerase, a culture of the strain, a lysate of the strain, and an extract of the lysate or culture, with a fructose-containing raw material.

8. The method of claim 4, wherein the mixed saccharide composition is obtained by mixing a psicose crystallization mother liquor having a psicose content of 80% by weight or higher and a glucose crystallization mother liquor having a glucose content of 80% by weight or higher.

9. The method of claim 8, wherein the psicose crystallization mother liquor comprises 80 to 99.9% by weight of psicose in the solid content of all saccharides and further comprises at least one selected from the group consisting of fructose, glucose, oligosaccharide and rare saccharide other than psicose.

10. The method of claim 9, wherein the psicose crystallization mother liquor comprises 20% by weight or lower of fructose and 1.0% by weight or lower of glucose, based on the solid content of all saccharides.

\* \* \* \* \*